(12) United States Patent
Kleinau et al.

(10) Patent No.: US 9,809,247 B2
(45) Date of Patent: Nov. 7, 2017

(54) MOTOR CONTROL CURRENT SENSOR LOSS OF ASSIST MITIGATION FOR ELECTRIC POWER STEERING

(71) Applicant: Steering Solutions IP Holding Corporation, Saginaw, MI (US)

(72) Inventors: Julie A. Kleinau, Bay City, MI (US); Prerit Pramod, Saginaw, MI (US); Dennis B. Skellenger, Saginaw, MI (US); Selva Kumar Sengottaiyan, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/006,901

(22) Filed: Jan. 26, 2016

(65) Prior Publication Data

US 2016/0229449 A1   Aug. 11, 2016

Related U.S. Application Data

(60) Provisional application No. 62/109,698, filed on Jan. 3, 2015.

(51) Int. Cl.
*B62D 5/04* (2006.01)
*H02P 23/00* (2016.01)

(52) U.S. Cl.
CPC ........... *B62D 5/0484* (2013.01); *B62D 5/049* (2013.01); *B62D 5/0463* (2013.01); *H02P 23/0004* (2013.01)

(58) Field of Classification Search
CPC .... B62D 5/0484; B62D 5/0463; B62D 5/049; H02P 23/0004
See application file for complete search history.

(56) References Cited

U.S. PATENT DOCUMENTS

| 4,713,596 A | 12/1987 | Bose |
| 4,733,149 A | 3/1988 | Culberson |

(Continued)

FOREIGN PATENT DOCUMENTS

| CN | 1675099 A | 9/2005 |
| CN | 1741368 A | 3/2006 |

(Continued)

OTHER PUBLICATIONS

Jeong et al., "Fault Detection and Fault-Tolerant Control of Interior Permanent-Magnet Motor Drive System for Electric Vehicle", IEEE Transactions on Industry Applications, vol. 41 No. 1, Jan. 2005, pp. 46-51.*

(Continued)

*Primary Examiner* — Todd Melton
(74) *Attorney, Agent, or Firm* — Cantor Colburn LLP (57) ABSTRACT

A power steering system includes a torque modifier module that generates a modified torque command in response to a current sensor fault, a magnitude of the modified torque command changes over a time period. The power steering system also includes a feedforward selection module that applies a dynamic feedforward compensation to a motor current command, thereby generating a motor voltage that is applied to a motor of the power steering system, the dynamic feedforward compensation modifies a frequency response of the power steering system.

19 Claims, 12 Drawing Sheets

(56) References Cited

U.S. PATENT DOCUMENTS

| | | |
|---|---|---|
| 4,920,306 A | 4/1990 | Mard et al. |
| 5,196,778 A | 3/1993 | Hayashida |
| 5,223,775 A | 6/1993 | Mongeau |
| 5,410,234 A | 4/1995 | Shibata et al. |
| 5,652,495 A | 7/1997 | Narazaki et al. |
| 5,927,430 A | 7/1999 | Mukai et al. |
| 5,962,999 A | 10/1999 | Nakamura et al. |
| 6,002,234 A | 12/1999 | Ohm et al. |
| 6,021,251 A | 2/2000 | Hammer et al. |
| 6,104,148 A | 8/2000 | Kumar et al. |
| 6,152,254 A | 11/2000 | Phillips |
| 6,161,068 A | 12/2000 | Kurishige et al. |
| 6,222,334 B1 | 4/2001 | Tamagawa et al. |
| 6,288,515 B1 | 9/2001 | Hiti et al. |
| 6,370,459 B1 | 4/2002 | Phillips |
| 6,465,975 B1 | 10/2002 | Naidu |
| 6,499,559 B2 | 12/2002 | McCann et al. |
| 6,605,912 B1 | 8/2003 | Bharadwaj et al. |
| 6,700,342 B2 | 3/2004 | Hampo et al. |
| 6,900,607 B2 | 5/2005 | Kleinau et al. |
| 7,034,493 B2 | 4/2006 | Yoshimoto et al. |
| 7,071,649 B2 | 7/2006 | Kleinau et al. |
| 7,145,310 B2 | 12/2006 | Ihm et al. |
| 7,199,549 B2 | 4/2007 | Kleinau et al. |
| 7,207,412 B2 | 4/2007 | Uryu |
| 7,394,214 B2 | 7/2008 | Endo et al. |
| 7,548,035 B2 | 6/2009 | Endo et al. |
| 7,576,506 B2 | 8/2009 | Kleinau et al. |
| 7,952,308 B2 | 5/2011 | Schulz et al. |
| 8,633,766 B2 | 1/2014 | Khlat et al. |
| 8,896,244 B2 | 11/2014 | Kleinau |
| 2002/0175649 A1 | 11/2002 | Reutlinger |
| 2003/0076065 A1 | 4/2003 | Shafer et al. |
| 2003/0146041 A1 | 8/2003 | Kanda |
| 2004/0095089 A1 | 5/2004 | Collier-Hallman |
| 2004/0195993 A1 | 10/2004 | Yoshimoto et al. |
| 2005/0073280 A1 | 4/2005 | Yoshinaga et al. |
| 2006/0100766 A1 | 5/2006 | Schwarz et al. |
| 2007/0043490 A1 | 2/2007 | Yokota et al. |
| 2007/0046126 A1 | 3/2007 | Sagoo et al. |
| 2007/0103105 A1 | 5/2007 | Endo et al. |
| 2007/0132446 A1 | 6/2007 | Kleinau et al. |
| 2007/0177314 A1 | 8/2007 | Weng et al. |
| 2007/0278032 A1 | 12/2007 | Sakaguchi et al. |
| 2008/0167779 A1 | 7/2008 | Suzuki |
| 2008/0191656 A1 | 8/2008 | Satake et al. |
| 2009/0026994 A1 | 1/2009 | Namuduri et al. |
| 2009/0027000 A1 | 1/2009 | Gallegos-Lopez et al. |
| 2009/0069979 A1 | 3/2009 | Yamashita et al. |
| 2009/0114470 A1 | 5/2009 | Shimizu et al. |
| 2009/0189555 A1 | 7/2009 | Chen |
| 2009/0224710 A1 | 9/2009 | Mir |
| 2009/0234538 A1 | 9/2009 | Ta et al. |
| 2009/0267555 A1 | 10/2009 | Schulz et al. |
| 2010/0153162 A1 | 6/2010 | Tam et al. |
| 2010/0231148 A1 | 9/2010 | Tobari et al. |
| 2011/0169432 A1 | 7/2011 | Dean |
| 2011/0175556 A1 | 7/2011 | Tobari et al. |
| 2011/0231066 A1 | 9/2011 | Ohno et al. |
| 2012/0112549 A1 | 5/2012 | Perisic et al. |
| 2012/0221208 A1 | 8/2012 | Kojo et al. |
| 2012/0313701 A1 | 12/2012 | Khlat et al. |
| 2013/0154524 A1 | 6/2013 | Kleinau |
| 2013/0187579 A1 | 7/2013 | Rozman et al. |
| 2013/0261896 A1 | 10/2013 | Gebregergis et al. |
| 2013/0285591 A1 | 10/2013 | Suzuki |
| 2014/0191699 A1 | 7/2014 | Dixon |
| 2014/0239860 A1 | 8/2014 | Kleinau |
| 2014/0265961 A1 | 9/2014 | Gebregergis et al. |
| 2014/0265962 A1 | 9/2014 | Gebregergis et al. |
| 2014/0375239 A1 | 12/2014 | Kim et al. |
| 2015/0155811 A1 | 6/2015 | Merienne |
| 2015/0222210 A1 | 8/2015 | Kleinau et al. |

FOREIGN PATENT DOCUMENTS

| | | |
|---|---|---|
| CN | 101218146 A | 7/2008 |
| CN | 101399516 B | 4/2009 |
| CN | 101456429 A | 6/2009 |
| CN | 101981804 A | 2/2011 |
| CN | 102570476 A | 7/2012 |
| CN | 102751936 A | 10/2012 |
| EP | 1378419 A2 | 1/2004 |
| EP | 1768252 A1 | 1/2006 |
| EP | 1720242 A1 | 11/2006 |
| EP | 1914878 A2 | 4/2008 |
| EP | 2003010 A2 | 12/2008 |
| EP | 2293428 A1 | 10/2009 |
| JP | 2000108916 A | 4/2000 |
| JP | 2001247049 A | 9/2001 |
| JP | 2003170850 A | 6/2003 |
| JP | 2007137272 A | 6/2007 |
| JP | 2008143200 A | 6/2008 |
| JP | 2012224258 A * | 11/2012 |
| WO | 2014006329 A2 | 1/2014 |

OTHER PUBLICATIONS

Chinese Office Action for Chinese Patent Application No. 201310104183.7 dated Jan. 6, 2015.

English translation of office action issued in related CN Application No. 201400942309, dated Jan. 18, 2016, 14 pages.

EP Search Report for related EP Application No. EP12196930.7; dated Mar. 22, 2013; 7 pages.

European Search Report from related Application No. 15171189: dated Jan. 4, 2016; 9 pages.

Extended European search report for related European application No. 16153434.2, dated Jul. 6, 2016, pp. 8.

F. Briz, et al., "Analysis and Design of current Regulators Using Complex Vectors", IEEE Industry Applications Society Annual Meeting, New Orleans, Louisiana; Oct. 5-9, 1997, pp. 1504-1511.

J. Kirtley, "6.061 Introduction to Electric Power Systems, Class Notes Chapter 12 Permanent Magnet 'Brushless DC'" Motors, Massachussetts Institute of Technology, Department of Electrical Engineering and Computer Science, Spring 2011.

L. Harnefors, et al., "Model-Based Current Control of AC Machines Using the Internal Model Control Method", IEEE Transactions on Industry Applications, vol. 34, No. 1, Jan./Feb. 1998, pp. 133-141.

Office Action issued in related CN Application No. 201400942309, dated Jan. 18, 2016, 18 pages.

EP SR dated May 12, 2017 in NXT0018EP.

* cited by examiner

MOTOR CONTROL CURRENT SENSOR LOSS OF ASSIST MITIGATION FOR ELECTRIC POWER STEERING

CROSS-REFERENCE TO RELATED APPLICATION

This patent application claims priority to U.S. Provisional Patent Application Ser. No. 62/109,698, filed Jan. 30, 2015, which is incorporated herein by reference in its entirety.

BACKGROUND OF THE INVENTION

The invention relates to motor control current sensor loss of assist mitigation for electric power steering (EPS).

EPS systems require the electric motor used to provide steering assist to be operated using a method of torque control. When using a Permanent Magnet Synchronous Machine (PMSM), Field Oriented Control (FOC) is utilized to allow the alternating current (AC) three-phase motor voltage and current signals to be transformed into a synchronously rotating reference frame, commonly referred to as the d/q axis reference frame. In a d/q axis reference frame, the motor voltages and currents become direct current (DC) quantities. The FOC torque control technique is commonly implemented either using feedforward methods of control or a closed loop current feedback control.

When a closed loop current feedback control is used, the ability of the system to regulate the torque is heavily dependent on the measured currents. However, current sensors, just like all sensors, are prone to failures. The most common forms of errors in current measurement are gain and offset errors. Offset errors can be particularly problematic, because depending on the magnitude of the error, the torque ripple caused by the offset error may become large enough to exceed requirements related to maximum steering effort.

A common method for mitigating loss of steering assist due to a current measurement fault is to transition from torque control utilizing a current regulator to achieve the desired motor current (and thus motor torque), to a torque control utilizing a static feedforward (inverse motor model) compensation when the fault is detected. However, a feedforward inverse motor model based torque control typically has much lower bandwidth as compared to a high bandwidth current control loop. The motor torque control loop in an electric power steering system is the actuator for the steering system, therefore should have a bandwidth several times higher than the outer steering assist control loop. The stability compensation for the steering assist control loop is designed in a manner suitable for the higher bandwidth of the torque control when the closed loop current control is active.

A stability compensation designed for the lower bandwidth feedforward inverse motor model based torque control used during a current sensor fault condition would be significantly different than the base stability compensation. This produces the undesirable result during a current sensor fault condition of the overall steering assist control loop being less stable in the faulted condition than in the nominal unfaulted condition.

SUMMARY OF THE INVENTION

In accordance with one embodiment, a power steering system comprises a torque modifier module that generates a modified torque command in response to a current sensor fault, a magnitude of the modified torque command changes over a time period, and a feedforward selection module that applies a dynamic feedforward compensation to a motor current command, thereby generating a motor voltage that is applied to a motor of the power steering system, the dynamic feedforward compensation modifies a frequency response of the power steering system, the motor current command is based on the modified torque command.

In accordance with another embodiment, a power steering system comprises a stability compensator selector module that selects a stability compensator of a steering torque control loop of the power steering system when a current sensor fault is detected, the stability compensator generates a compensated torque command, and a torque modifier module that generates a modified torque command from the compensated torque command in response to a current sensor fault, a magnitude of the modified torque command changes over a time period, a motor voltage that is applied to a motor of the power steering system is based on the modified torque command.

In accordance with another embodiment, a method for controlling a power steering system comprises generating a modified torque command in response to a current sensor fault, a magnitude of the modified torque command changes over a time period; and applying a dynamic feedforward compensation to a motor current command, thereby generating a motor voltage that is applied to a motor of the power steering system, the dynamic feedforward compensation modifies a frequency response of the power steering system, the motor current command is based on the modified torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
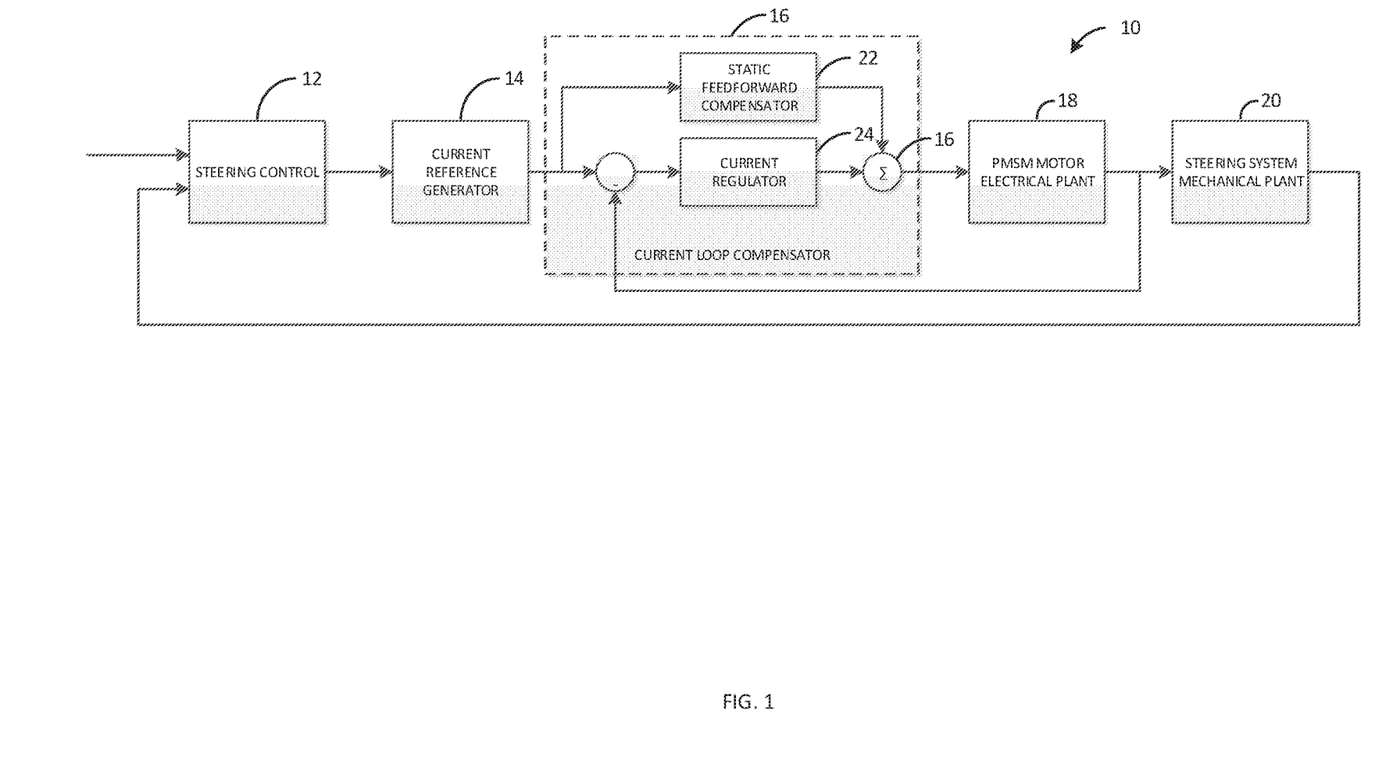
FIG. 1 illustrates a steering control system in accordance with some embodiments.

Referring now to the Figures, where the invention will be described with reference to specific embodiments, without limiting same, FIG. 1 illustrates a steering control system 10. In the embodiment as shown, the steering control system 10 includes a steering control module 12, a current reference generator 14, a current loop compensator 16, a motor 18 represented by the PMSM motor electrical plant, and a steering system mechanical plant 20. The current loop compensator 16 may include a current regulator 24 along with a static feedforward compensator 22. The outputs of the current regulator 24 and the static feedforward compensator 22 are joined at summation block 26, to form a control signal for the PMSM motor electrical plant. The static feedforward compensator 22 may be active regardless of the feedback provided by the electrical plant. Although a coupled P.I. configuration is shown in FIG. 1, the subject matter disclosed herein is not limited to this configuration.

Figure 2:
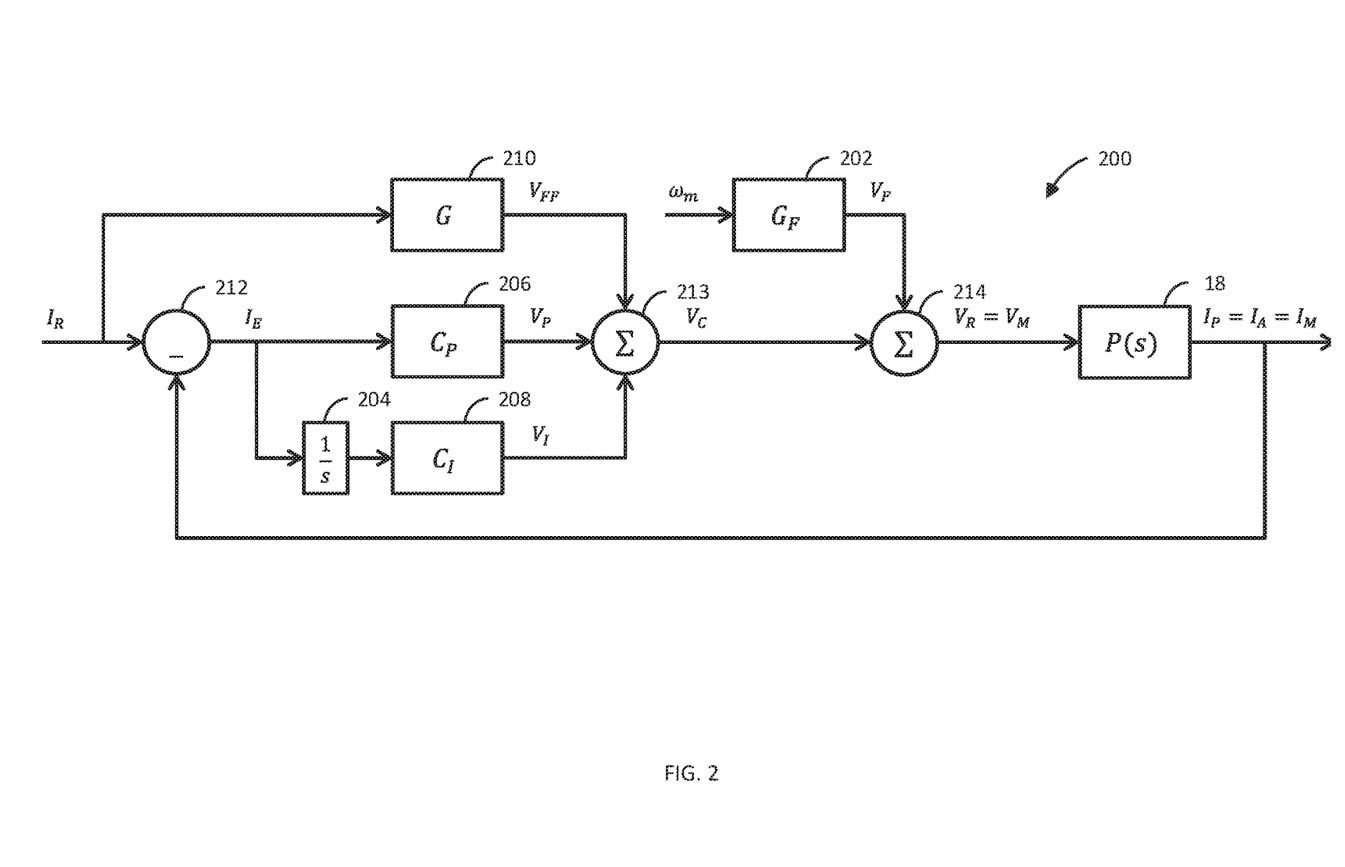
FIG. 2 illustrates a block diagram of a current regulator configuration in accordance with some embodiments.

FIG. 2 illustrates one type of current regulator 200 in accordance with some embodiments. As shown, the control configuration includes several sub-modules—a BEMF compensation module $G_F$ 202, an integration module 204, proportional compensation module $C_P$ 206 and integral compensation module $C_I$ 208, feedforward compensation module G 210, a subtraction module 212, and addition modules 213, 214. FIG. 2 also illustrates the motor 18.

The compensation modules $G_F$ 202, $C_P$ 206 and $C_I$ 208, and the plant P(s) of the motor 18 are 2×2 matrices. Signals $I_R$, $I_E$, $I_P$, $I_A$, $I_M$, $V_P$, $V_I$, $V_C$, $V_{FF}$, $V_F$, $V_R$, $V_M$ are vectors with two values each, corresponding to the d and q axes.

The current mode control configuration implemented in FIG. 2 may be represented by matrix compensators. The following equations defined in the d/q axis coordinate frame describe the plant transfer function (using line to neutral definitions):

$$V_d = L_d \frac{dI_d}{dt} + RI_d + \frac{N_p}{2}\omega_m L_q I_q \quad \text{(Equation 1)}$$

$$V_q = L_q \frac{dI_q}{dt} + RI_q - \frac{N_p}{2}\omega_m L_d I_d + K_e \omega_m \quad \text{(Equation 2)}$$

$$T_e = \frac{3}{2}K_e I_q + \frac{3}{4}N_p(L_q - L_d)I_d I_q \quad \text{(Equation 3)}$$

$V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF coefficient (in Volts/rad/s), $\omega_m$ is the mechanical motor velocity in (in rad/s), and $T_e$ is the electromagnetic motor torque (in Nm).

The torque equation may be nonlinear and may represent a sum of the torque developed by leveraging the magnetic field from the permanent magnets, and the reluctance torque generated by rotor saliency (difference between $L_d$ and $L_q$) and predefined values of $I_q$ and $I_d$.

Equations 1 and 2 may be rewritten as follows:

$$V_d = L_d \dot{I}_d + RI_d + \omega_e L_q I_q \quad \text{(Equation 4)}$$

$$V'_q = V_q - K_e \omega_m = L_q \dot{I}_q + RI_q - \omega_e L_d I_d \quad \text{(Equation 5)}$$

In the above equations, $$\omega_e = \frac{N_P}{2}\omega_m$$

is the electrical speed of the machine. To employ standard linear feedback control design techniques, the machine speed is assumed to be a slowly varying parameter. It can be appreciated that due to relatively slow flux dynamics, the quasi-static back-EMF (BEMF) term $K_e \omega_m$ can be considered to be essentially constant, which is compensated as a disturbance in the feedforward path. These two assumptions allow linearization of equations 4 and 5 for a fixed speed. Note that the apostrophe in the $V'_q$ term is dropped in the equations below.

Equations 4 and 5 can re-written using s-domain representation as follows:

$$U = P_i(s)X \quad \text{(Equation 6)}$$

$$\begin{bmatrix} V_d \\ V_q \end{bmatrix} = \begin{bmatrix} L_d s + R & \omega_e L_q \\ -\omega_e L_d & L_q s + R \end{bmatrix} \begin{bmatrix} I_d \\ I_q \end{bmatrix} \quad \text{(Equation 7)}$$

Note that this description translates plant outputs into inputs via the complex frequency transfer matrix $P_i(s)$, and is thus the inverse of the true plant transfer matrix. The block diagram for the above description (with the additional BEMF term also shown) is shown in the block diagram of the motor shown in FIG. 3. Specifically, FIG. 3 illustrates the quasi-static back-EMF (BEMF) term $K_e \omega_m$ and the motor 18 includes matrix represented by equation 7.

Figure 3:
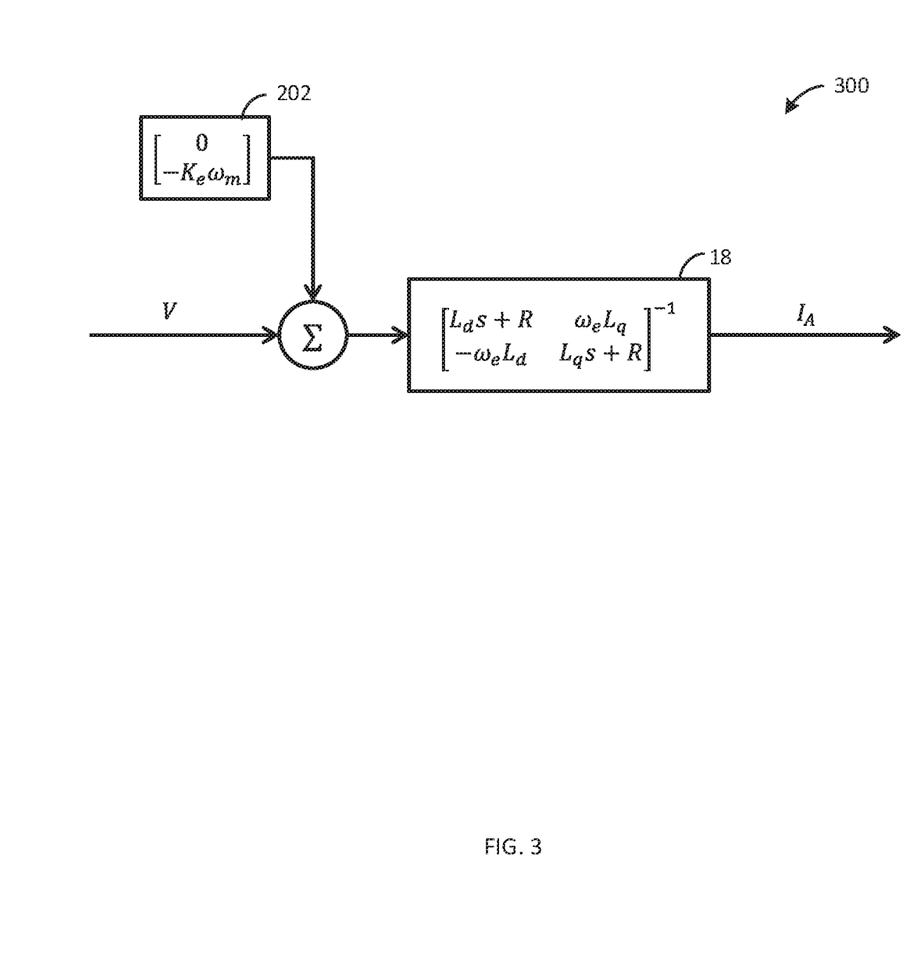
FIG. 3 illustrates a block diagram of the motor electrical system in accordance with some embodiments.

The closed loop transfer matrix T relating the reference currents $I_R$ to the actual currents $I_A$ for the current control system shown in FIG. 3 may be written in terms of the matrix compensators as:

$$I_A = TI_R = (P^{-1} + C)^{-1}(G + C)I_R \quad \text{(Equation 8)}$$

By inserting the appropriate compensator matrices in the above expressions, the transfer matrix T may be expressed in equation 9 as follows:

$$T = \begin{bmatrix} T_{dd}(s) & T_{dq}(s) \\ T_{qd}(s) & T_{qq}(s) \end{bmatrix} =$$

$$\begin{bmatrix} \frac{(L_q s^2 + (R + K_{pq})s + K_{iq})((\tilde{R} + K_{pd})s + K_{id}) + s^2 \tilde{\omega}_e^2 \tilde{L}_d \tilde{L}_q}{(L_q s^2 + (R + K_{pq})s + K_{iq})(L_d s^2 + (R + K_{pd})s + K_{id}) + s^2 \omega_e^2 L_d L_q} & \frac{(L_q s^2 + (R + K_{pq})s + K_{iq})\tilde{\omega}_e \tilde{L}_q - ((\tilde{R} + K_{pd})s + K_{id})\omega_e L_q}{(L_q s^2 + (R + K_{pq})s + K_{iq})(L_d s^2 + (R + K_{pd})s + K_{id}) + s^2 \omega_e^2 L_d L_q} \\ \frac{((\tilde{R} + K_{pd})s + K_{id})\omega_e L_d - (L_d s^2 + (R + K_{pd})s + K_{id})\tilde{\omega}_e \tilde{L}_d}{(L_q s^2 + (R + K_{pq})s + K_{iq})(L_d s^2 + (R + K_{pd})s + K_{id}) + s^2 \omega_e^2 L_d L_q} & \frac{(L_d s^2 + (R + K_{pd})s + K_{id})((\tilde{R} + K_{pq})s + K_{iq}) + s^2 \tilde{\omega}_e^2 \tilde{L}_d \tilde{L}_q}{(L_d s^2 + (R + K_{pd})s + K_{id})(L_q s^2 + (R + K_{pq})s + K_{iq}) + s^2 \omega_e^2 L_d L_q} \end{bmatrix}$$

Terms $T_{dd}(s)$ and $T_{qq}(s)$ are the direct current to current transfer functions, while $T_{dq}(s)$ and $T_{qd}(s)$ represent the cross coupling between the two current loops. For a typical system, the direct transfer functions have extremely high bandwidth.

Figure 4:
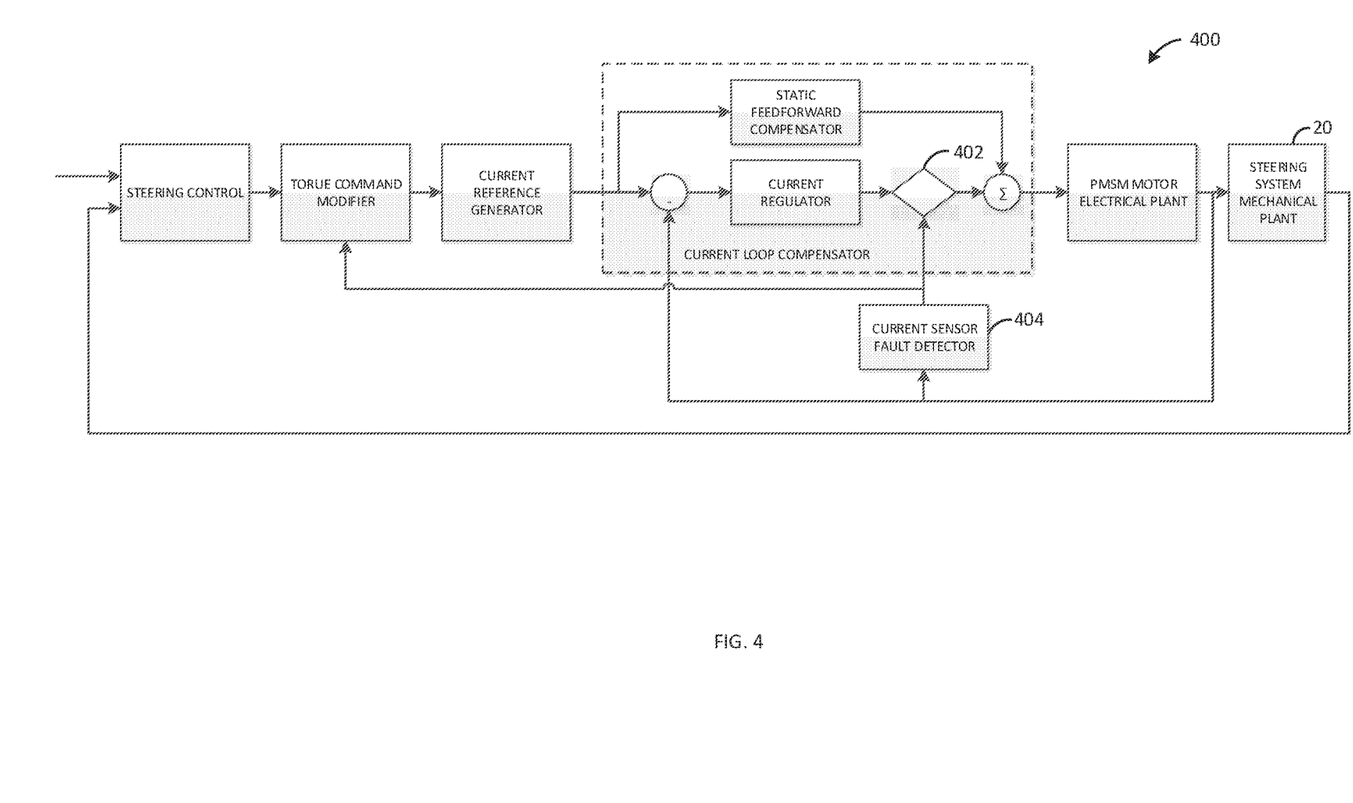
FIG. 4 illustrates a typical current sensor fault loss of assist mitigation algorithm in accordance with some embodiments.

A block diagram depicting a typical current sensor fault loss of assist mitigation algorithm 400 is shown in FIG. 4. As described in more detail below, a current regulator selector 402 may be selectively enabled or disabled by a logic input. The current regulator selector 402 may select a mode of feedforward control depending on the fault condition. Algorithms described in more detail below may also be implemented to modify the torque command during the detection of the current sensor fault to ensure smooth transition from feedback control to feedforward control mode.

Figure 5:
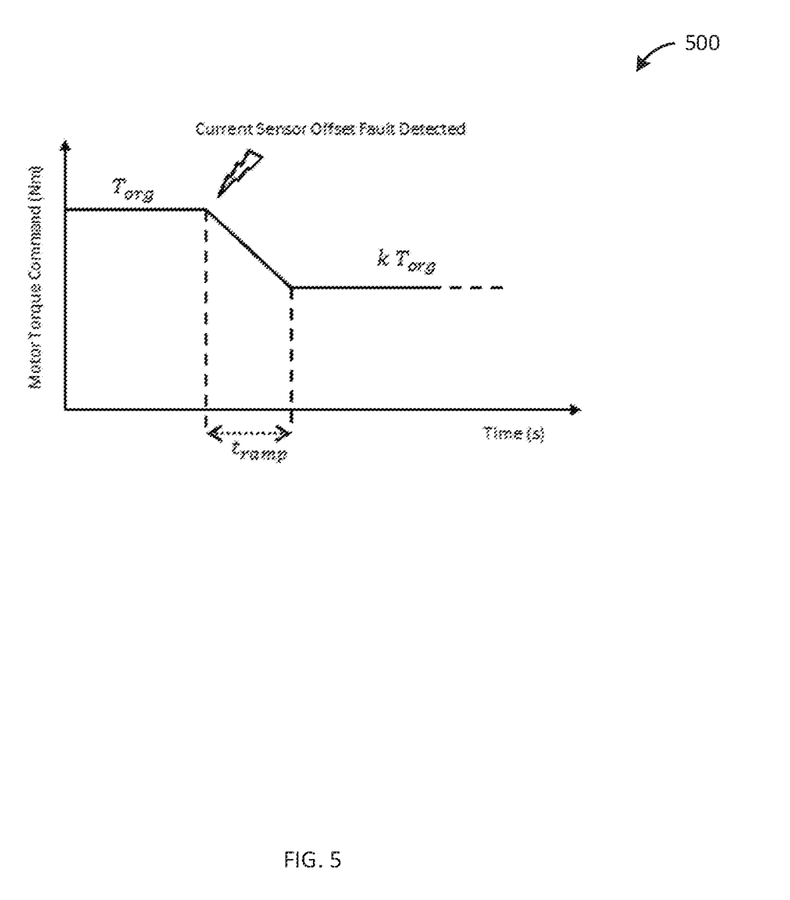
FIG. 5 illustrates a plot of a torque command change during a current sensor failure in accordance with some embodiments.

For example, a first ramp waveform as shown in FIG. 5 may be implemented by the torque command modifier, as described in more detail below, to decrease the torque command during a time $t_{ramp}$ immediately after a fault detection. FIG. 5 illustrates a torque command change upon detection of a fault. When a fault is detected, the torque command modifier may implement the ramp waveform shown in FIG. 5 by reducing the torque command over a time period $t_{ramp}$. After the time period $t_{ramp}$, a modified torque command is reduced by a scale factor k to a magnitude of the product of scale factor k and $T_{org}$. The modified torque command may be output by the torque command modifier as described in more detail below.

Figure 6:
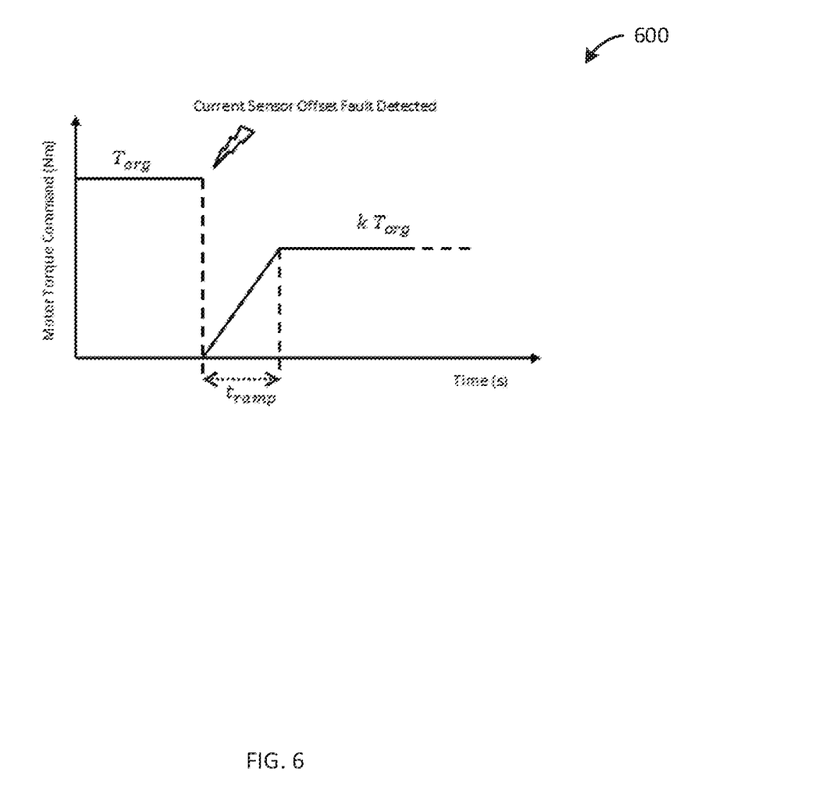
FIG. 6 illustrates a second plot of a torque command change during a current sensor failure in accordance with some embodiments.

A second torque ramp return waveform 600 is illustrated in FIG. 6. In some cases, the torque ripple caused by the offset error may exceed requirements related to maximum steering effort, so the torque command is set to zero immediately after the current sensor fault is detected. Accordingly, after the torque command is set to a zero value, the torque command is increased over a time period $t_{ramp}$. The torque command may return to a steady-state value after time period $t_{ramp}$. The modified torque command may be a function of the scale factor k and may be reduced by this scale factor in a steady state condition. The modified torque command may be reduced by a scale factor k as shown in FIG. 6.

Although two specific embodiments of torque ramp return waveforms are shown, the torque command modifier may be configured to implement any number of ramp return waveforms, and the subject application is not limited to the waveforms shown in FIGS. 5 and 6. Further, other algorithms may be added to the torque command to avoid any disturbance the driver may feel during the transition period.

Figure 7:
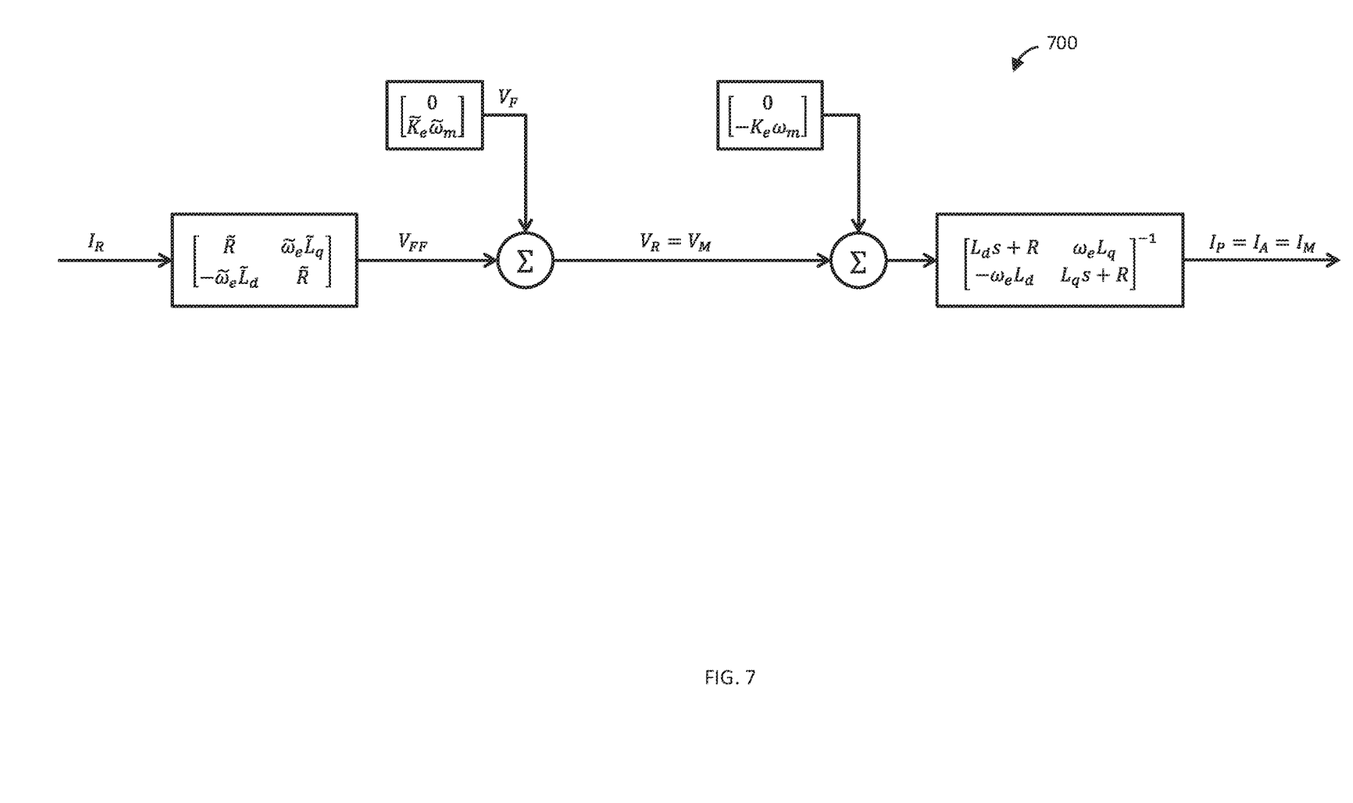
FIG. 7 illustrates an open loop current control block diagram with static feedforward compensation in accordance with some embodiments.

FIG. 7 illustrates an open loop feedback current control block diagram 700 where the feedback loop is opened and only static feedforward compensation is employed. The motor control current loop block diagram can be simplified as shown. For this case, the direct transfer functions become:

$$T_{dd}(s) = \frac{L_q \tilde{R}s + R\tilde{R} + \omega_e \tilde{\omega}_e \tilde{L}_d L_q}{L_d L_q s^2 + R(L_d + L_q)s + R^2 + \omega_e^2 L_d L_q} \quad \text{(Equation 9)}$$

$$T_{qq}(s) = \frac{L_d \tilde{R}s + R\tilde{R} + \omega_e \tilde{\omega}_e \tilde{L}_q L_d}{L_d L_q s^2 + R(L_d + L_q)s + R^2 + \omega_e^2 L_d L_q} \quad \text{(Equation 10)}$$

Figure 8:
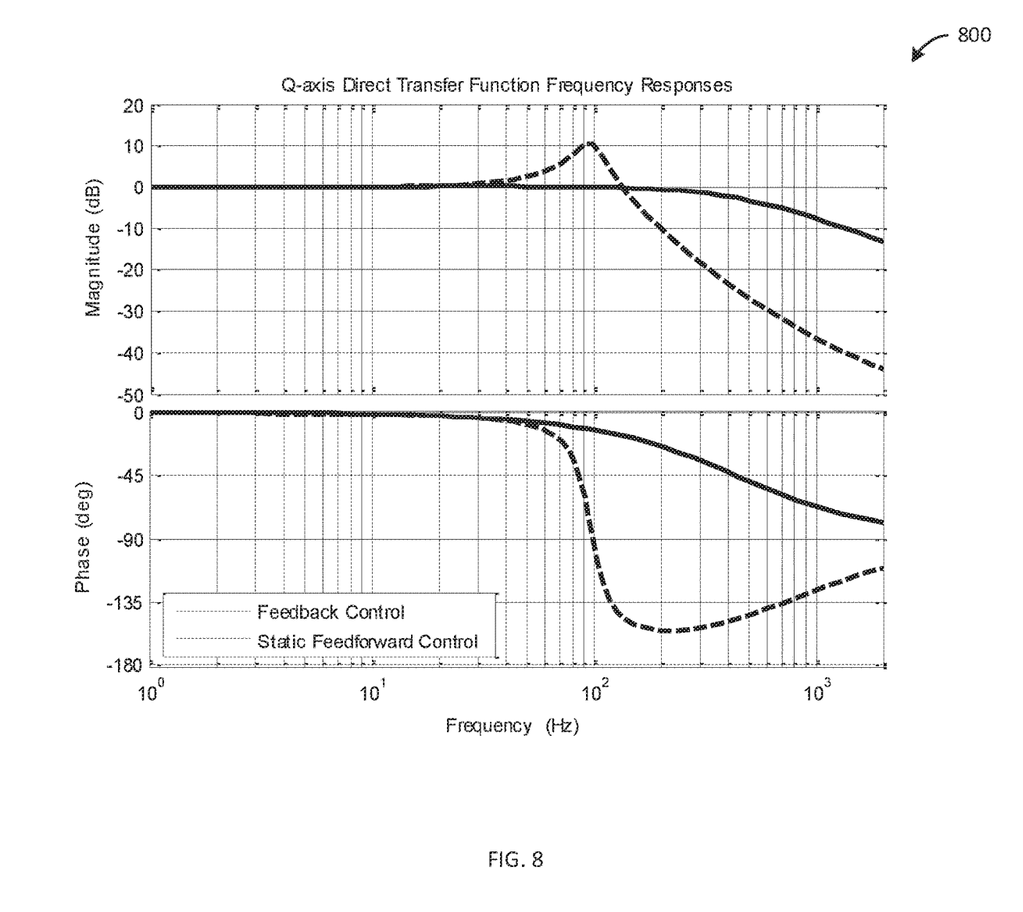
FIG. 8 illustrates a comparison plot of the frequency responses of the q-axis direct transfer functions at an operating speed in accordance with some embodiments.

FIG. 8 represents a comparison plot 800 of a comparison of the frequency responses of the q-axis direct transfer functions at an operating speed of $\omega_m = 200$ rad/s. As shown in FIG. 8, static compensation provides undesirable frequency responses in terms of both magnitude and phase, as compared to the feedback compensation.

To compensate for undesirable frequency responses, a stability compensator of the steering control system may be changed at the time the fault occurs. However, a stability compensator would have to be tuned for the motor control loop bandwidth with the static feedforward control configuration. Further, since the stability compensator is a notch filter with various states, when the switching occurs, all the state variables will get re-initialized to zero, causing a lag in response time. Additionally, a modified torque component may be required during the transition.

Figure 9:
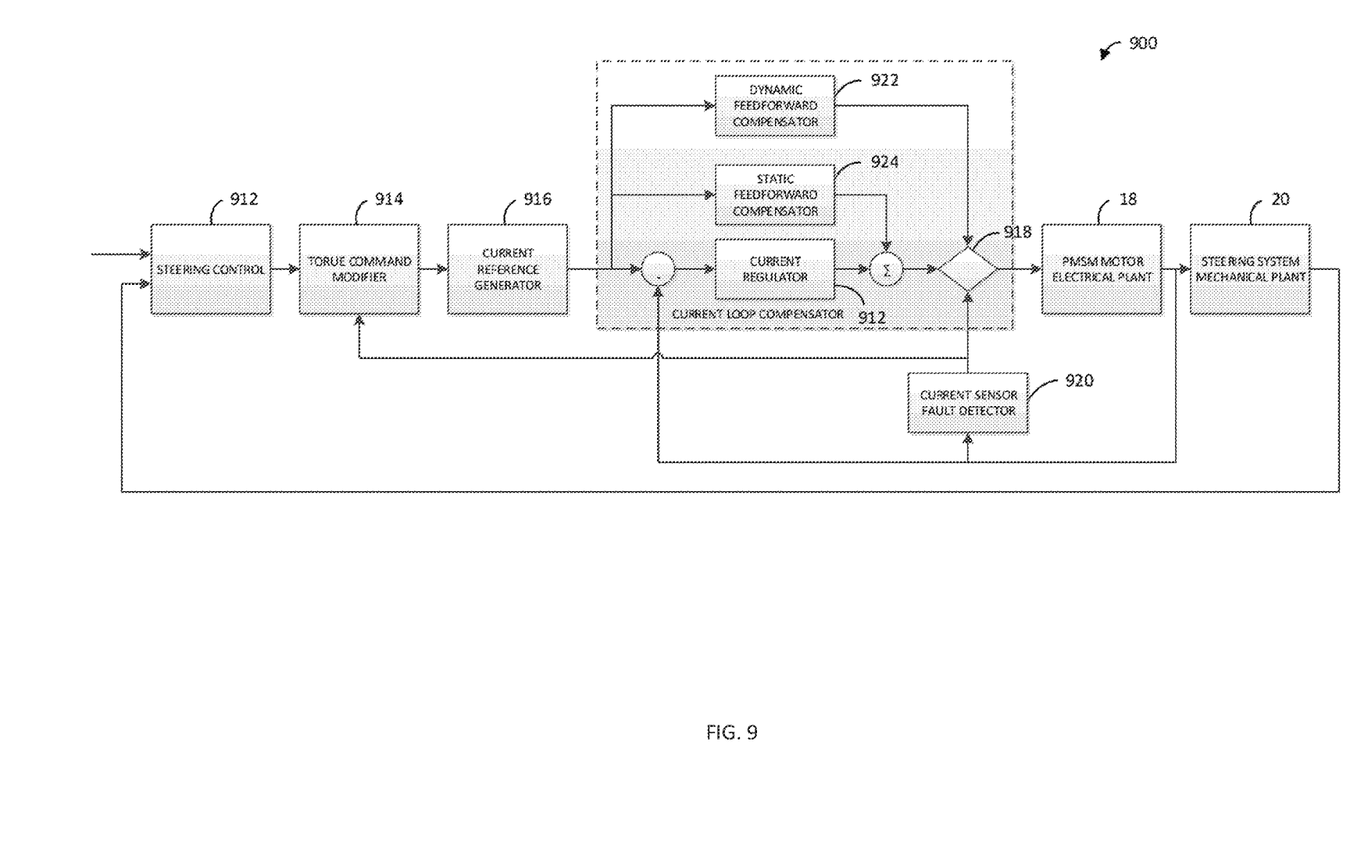
FIG. 9 illustrates a loss of assist mitigation algorithm block diagram in accordance with some embodiments.
Figure 9A:
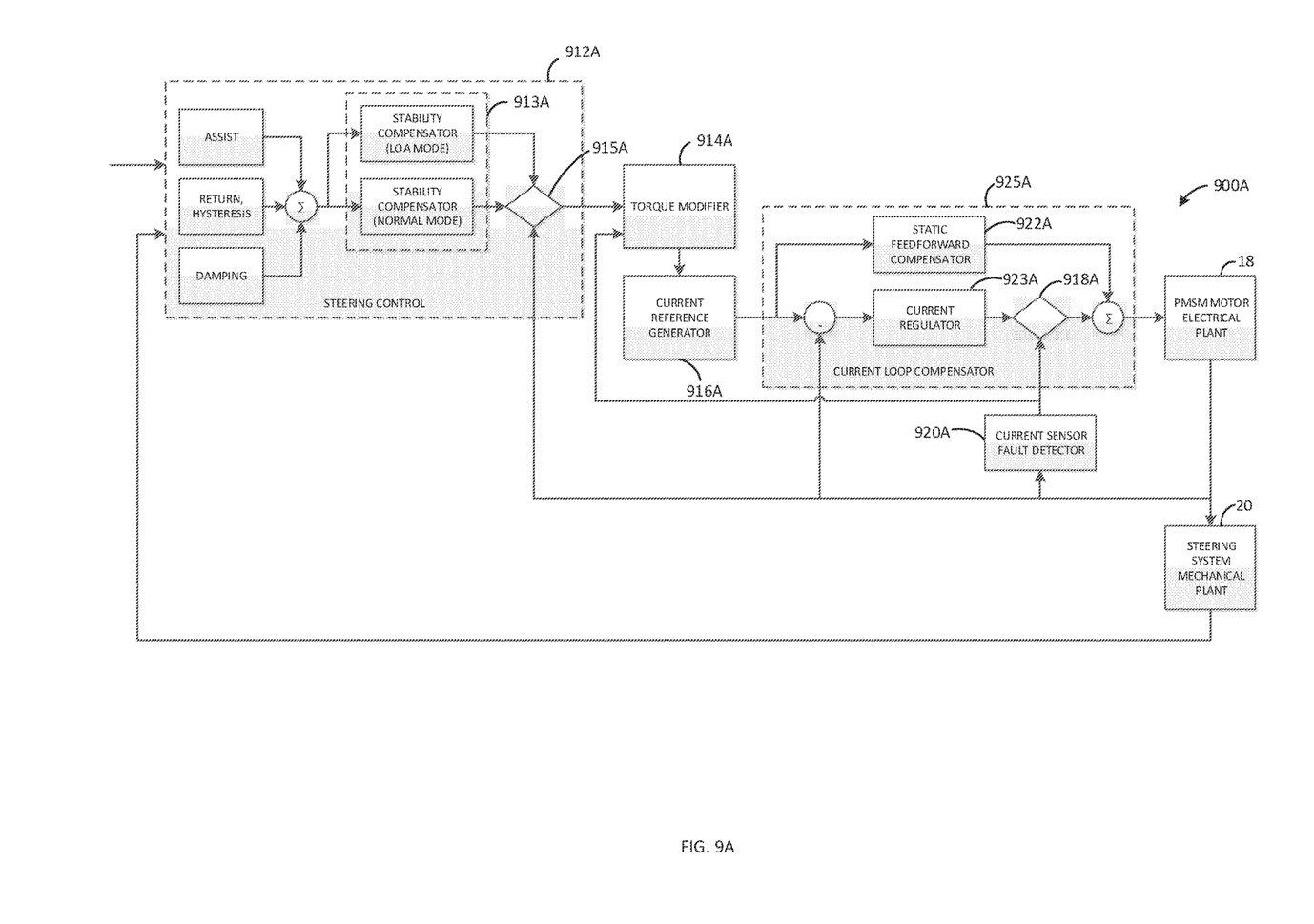
FIG. 9A illustrates a loss of assist mitigation algorithm block diagram in accordance with some embodiments.

FIG. 9A shows a steering control system 900A with one type of current loop compensator 925A design. The configuration shown in FIG. 9A may control the PMSM motor electrical plant of the motor 18 by generating an output current from an input voltage command. Specifically, FIG. 9A includes a static feedforward compensation module 922A and a current regulation module 923A.

FIG. 9A also includes a steering control module 912A with a stability compensator module 913A, a torque modifier module 914A, a stability compensator selector module 915A and a current reference generator module 916A. A feedforward selection module 918A changes the mode of the current regulator module 923A in the event a current sensor failure is detected. The feedforward selection module 918A selects a mode of the current regulator module 923A for the electric motor of the system, which is sent to the PMSM motor electrical plant of the motor 18.

The system may further include a current sensor fault detector module 920A that detects an operational state of a current sensor (not shown). The current sensor fault detector module 920A may send an enable command to the stability compensator selector module 915A, the torque modifier module 914A, and the feedforward selection module 918A.

In response to the detection of a current sensor fault by current sensor fault detector module 920A, the stability compensator selector module 915A may implement a loss of assist mode in the steering system by selecting a loss of assist mode output from the stability compensator module 913A, and therefore generate a compensated torque command that is sent to the torque command modifier module 913A. The selection of the loss of assist mode output changes a function provided by the stability compensator module 913A upon the detection of the current sensor fault. The stability compensator module 913A may be tuned as a function of the motor control bandwidth, while the static feedforward control configuration implemented in the current loop compensator 925A may not change when the feedforward selection module 918A receives the enable command from the current sensor fault detector module 920A.

The stability compensator module 913A is, in some embodiments, a notch filter that can be programmed with a plurality of states. During the change of the function of the stability compensator module 913A as controlled by the stability compensator selector module 915A, state variables of the stability compensator module 913A may be re-initialized to zero values, and over time, transition to values that represent the actual state of the steering system 900A.

Specifically, the torque modifier module 914A may implement the first and second ramp waveforms as shown in FIG. 5 and FIG. 6, respectively, to assist with mitigation of any disruptions caused by the current sensor fault.

The torque modifier module 914A may generate a modified torque command in response to a current sensor fault. A magnitude of the modified torque command may change over time and be consistent with the waveforms shown in FIG. 5 and FIG. 6. As emphasized above, the torque modifier module 914A is not limited to the implementation of the waveforms shown in FIGS. 5 and 6.

Turning to FIG. 9, this figure includes a steering control module 912, a torque modifier module 914, and a current reference generator module 916. FIG. 9 further includes a feedforward selection module 918 that enables a dynamic feedforward compensation in the event of a detection of a sensor failure. The feedforward selection module 918 modifies the torque command sent to the electric motor of the system, which is represented by the PMSM motor electrical plant of the motor 18.

The system may further include a current sensor fault detector module 920 that detects an operational state of a current sensor (not shown). The current sensor fault detector module 920 may send an enable command to the torque modifier module 914 and to the feedforward selection module 918.

The torque modifier module 914 may implement the first and second ramp waveforms as shown in FIG. 5 and FIG. 6, respectively, to assist with mitigation of any disruptions caused by the current sensor fault. The torque modifier module 914 may generate a modified torque command in response to a current sensor fault. A magnitude of the modified torque command may change over time and be consistent with the waveforms shown in FIG. 5 and FIG. 6. As emphasized above, the torque modifier module 914 is not limited to the implementation of the waveforms shown in FIGS. 5 and 6.

The feedforward selection module 918 may select a dynamic feedforward compensation mode that processes a motor current command. The motor current command may be generated by the current reference generator 916 in response to the current reference generator 916 receiving the torque command modifier. The processing of the motor current command may change the voltage commands sent to the electric motor in response to the current sensor fault detection.

The dynamic feedforward compensation algorithm applied by the feedforward selection module 918 may be performed by the dynamic feedforward compensator module 922. The dynamic feedforward compensator module 922 may use a derivative transfer function implemented by a derivative estimation submodule (not shown). The dynamic feedforward compensator module 922 may modify a frequency response of a motor control loop of the power steering system. Ideally, the derivative transfer function is a true derivative that may be denoted by Laplace transform variable s, however in some embodiments, the transfer function may be represented by an approximation of the derivative, $\tilde{s}$, as follows:

$$\tilde{s} = \frac{s}{(\tau s + 1)^n} \qquad \text{(Equation 12)}$$

The derivative estimation submodule may be a high pass filter in some embodiments, but in other embodiments the derivative estimation submodule may be a discrete time derivative filter with specific magnitude and phase characteristics.

In should be appreciated that although the static feedforward module 922 is shown in FIG. 9, the static feedforward module 922 is not essential for operation of the system of FIG. 9 upon implementation of the dynamic feedforward algorithm.

The stability compensator of the steering control module 912 is, in some embodiments, a notch filter that can be programmed with a plurality of states. During the change of the function of the stability compensator as controlled by the stability compensator selector module, state variables of the stability compensator may be re-initialized to zero values, and over time, transition to values that represent the actual state of the steering system.

Figure 10:
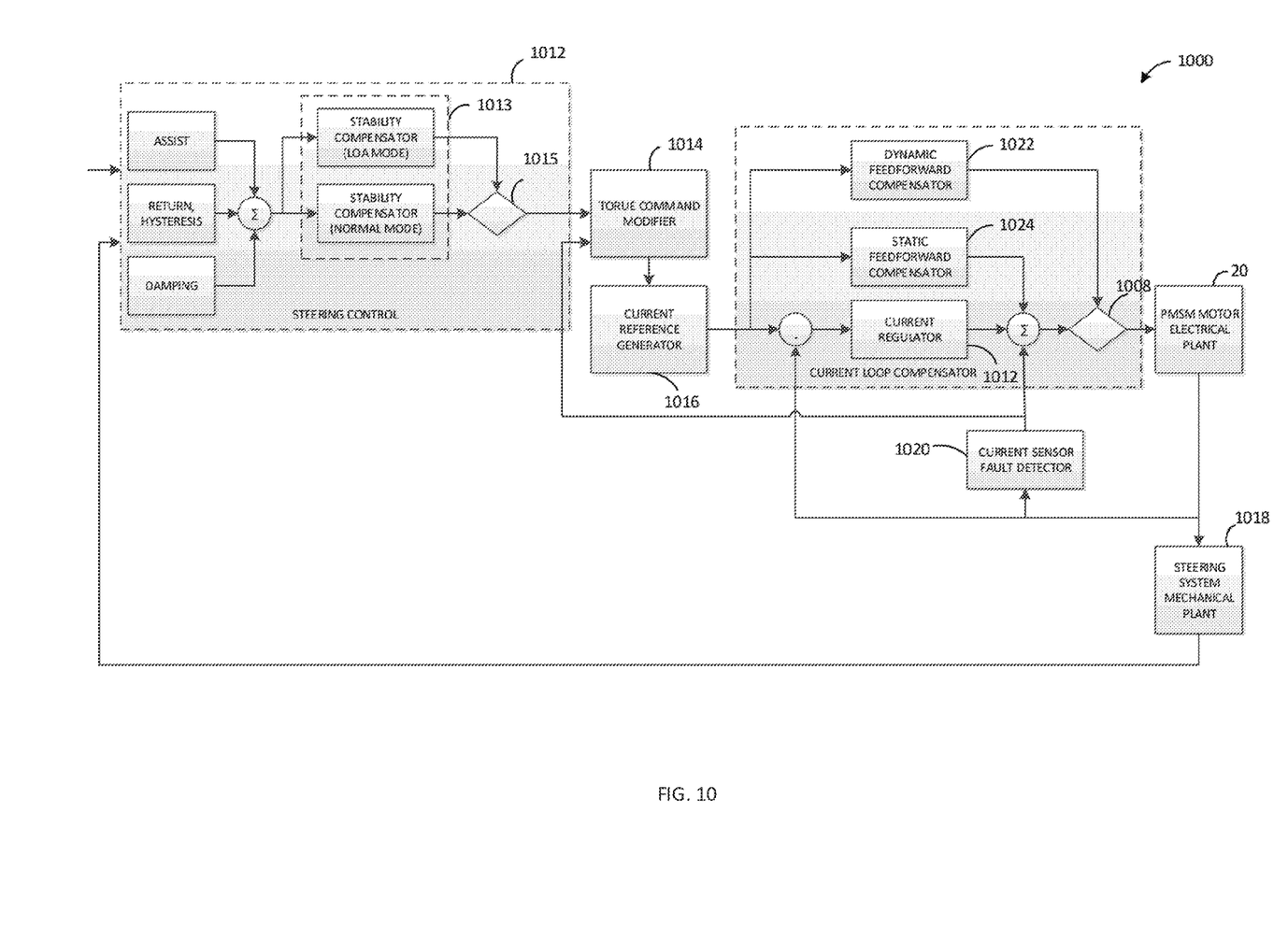
FIG. 10 illustrates a loss of assist mitigation algorithm block diagram in accordance with some embodiments.

FIG. 10 includes a steering control module 1012 with a stability compensator module 1013, a torque modifier module 1014, a stability compensator selector module 1015 and a current reference generator module 1016. A feedforward selection module 1008 changes the mode of the current regulator module 1023 in the event a current sensor failure is detected. The feedforward selection module 1008 selects a mode of the current regulator module 1023 for the electric motor of the system, which is sent to the PMSM motor electrical plant of the motor 18.

Specifically, the torque modifier module 1014 may implement the first and second ramp waveforms as shown in FIG. 5 and FIG. 6, respectively, to assist with mitigation of any disruptions caused by the current sensor fault.

Similar to the description provided in FIG. 9A, in response to the detection of a current sensor fault by current sensor fault detector module 1020, the stability compensator selector module 1015 may implement a loss of assist mode in the steering system by selecting a loss of assist mode output from the stability compensator module 1013. The selection of the loss of assist mode output changes a function provided by the stability compensator module 1013 upon the detection of the current sensor fault.

In addition, a feedforward selection module 1008 enables a dynamic feedforward compensation in the event of a detection of a sensor failure. The feedforward selection module 1008 modifies the torque command sent to the electric motor of the system, which is represented by the PMSM motor electrical plant of the steering system mechanical plant 1018.

Figure 11:
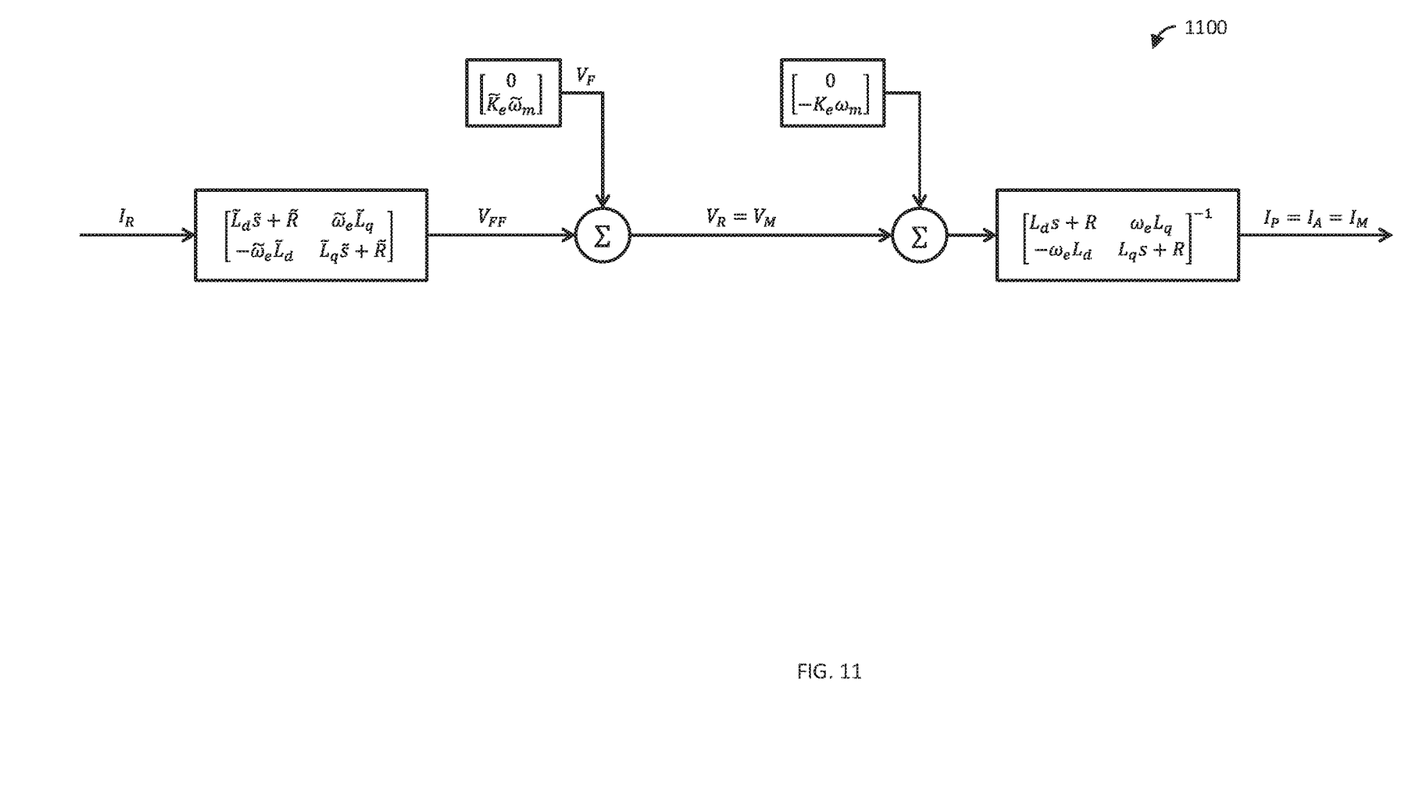
FIG. 11 illustrates a block diagram for the motor control current loop under a fault condition with dynamic feedforward compensation.

FIG. 11 is a simplified block diagram for the motor control current loop under fault condition with dynamic feedforward compensation employed. The derivative term is shown as $\tilde{s}$. The derivative compensator included in the derivative estimation module is an approximation of a true derivative. In general, many different types of derivative filter designs may be used, from simple high pass filters to more sophisticated discrete time derivative filters with specific magnitude and phase characteristics, depending on the application.

For FIG. 11, the direct transfer functions become:

$$T_{dd}(s) = \frac{L_q \tilde{L}_d s \tilde{s} + L_q \tilde{R} s + \tilde{L}_d R \tilde{s} + \omega_e \tilde{\omega}_e \tilde{L}_d L_q}{L_d L_q s^2 + R(L_d + L_q)s + R^2 + \omega_e^2 L_d L_q} \qquad \text{(Equation 13)}$$

$$T_{qq}(s) = \frac{L_d \tilde{L}_q s \tilde{s} + L_d \tilde{R} s + \tilde{L}_q R \tilde{s} + \omega_e \tilde{\omega}_e \tilde{L}_q L_d}{L_d L_q s^2 + R(L_d + L_q)s + R^2 + \omega_e^2 L_d L_q} \qquad \text{(Equation 14)}$$

It can be appreciated from equations 13 and 14 that if the derivative filter were ideal, both the transfer functions would simply become unity. The derivative filter is contained within the derivative estimation module 1110 in FIG. 11.

If the current loop has a different configuration, and does not have a complete feedforward compensator during normal operation, then the full dynamic feedforward compensation terms can be calculated continuously, but applied only during the fault condition.

As used above, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in the above Figures may be combined and/or further partitioned.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering system comprising:
a torque modifier module that generates a modified torque command in response to a current sensor fault, a magnitude of the modified torque command changes over a time period; and
a feedforward selection module that applies a dynamic feedforward compensation to a motor current command, the dynamic feedforward compensation based on motor inductance and motor-circuit resistance, thereby generating a motor voltage that is applied to a motor of the power steering system, the dynamic feedforward compensation modifies a frequency response of the power steering system, the motor current command is based on the modified torque command.

2. The power steering system of claim 1, further comprising a stability compensator selector module that selects a stability compensator of a steering torque control loop of the power steering system when a current sensor fault is detected, the stability compensator selector module generates a compensated torque command sent to the torque modifier module.

3. The power steering system of claim 2, the modified torque command is based at least in part on the compensated torque command.

4. The power steering system of claim 2, the dynamic feedforward compensation is based on a transfer function defined by an approximation of a true derivative.

5. The power steering system of claim 4, the approximation of the true derivative is represented by $$\tilde{s} = \frac{s}{(\tau s + 1)^n}.$$

6. The power steering system of claim 1, the modified torque command is reduced to a magnitude of zero when the current sensor fault is detected, the modified torque command is increased from a magnitude of zero over a time period.

7. The power steering system of claim 6, the modified torque command has a steady state value defined by a scale factor applied to the modified torque command during the time period.

8. A power steering system comprising:
a stability compensator selector module that selects a stability compensator of a steering torque control loop of the power steering system when a current sensor fault is detected, the stability compensator generates a compensated torque command based on frequency response of a motor control system of a motor of the power steering system; and
a torque modifier module that generates a modified torque command from the compensated torque command in response to a current sensor fault, a magnitude of the modified torque command changes over a time period, a motor voltage that is applied to the motor of the power steering system is based on the modified torque command.

9. The power steering system of claim 8, further comprising a feedforward selection module that applies a dynamic feedforward compensation to a motor current command, thereby generating the motor voltage that is applied to a motor of the power steering system, the dynamic feedforward compensation modifies a frequency response of the power steering system, the motor current command is based on the modified torque command.

10. The power steering system of claim 9, the dynamic feedforward compensation is based on a transfer function defined by an approximation of a true derivative.

11. The power steering system of claim 10, the approximation of the true derivative is represented by $$\tilde{s} = \frac{s}{(\tau s + 1)^n}.$$

12. The power steering system of claim 8, the modified torque command is increased from a magnitude of zero when the current sensor fault is detected.

13. The power steering system of claim 12, the modified torque command has a steady state value defined by a scale factor applied to the modified torque command during a time period.

14. A method for controlling a power steering system comprising:
generating a modified torque command in response to a current sensor fault, a magnitude of the modified torque command changes over a time period; and
applying a dynamic feedforward compensation to a motor current command, the dynamic feedforward compensation based on motor inductance and motor-circuit resistance, thereby generating a motor voltage that is applied to a motor of the power steering system, the dynamic feedforward compensation modifies a frequency response of the power steering system, the motor current command is based on the modified torque command.

15. The method of claim 14, further comprising selecting a stability compensator of a steering torque control loop of the power steering system when a current sensor fault is detected, the stability compensator selector module generates a compensated torque command.

16. The method of claim 14, the modified torque command is increased from a magnitude of zero when the current sensor fault is detected.

17. The method of claim 16, the modified torque command has a steady state value defined by a scale factor applied to the modified torque command during a time period.

18. The method of claim 14, the dynamic feedforward compensation is based on a transfer function defined by an approximation of a true derivative.

19. The method of claim 18, the approximation of the true derivative is represented by $$\tilde{s} = \frac{s}{(\tau s + 1)^n}.$$

\* \* \* \* \*